United States Patent
Yang et al.

(10) Patent No.: US 9,120,089 B2
(45) Date of Patent: Sep. 1, 2015

(54) CATALYST SUPPORT USED FOR OLEFIN POLYMERIZATION AND PREPARING METHOD AND APPLICATION THEREOF

(75) Inventors: Yongrong Yang, Zhejiang (CN); Wenqing Wu, Tianjin (CN); Jingdai Wang, Zhejiang (CN); Lijun Du, Zhejiang (CN); Wei Li, Zhejiang (CN); Lina Fan, Zhejiang (CN); Binbo Jiang, Zhejiang (CN); Zhengliang Huang, Zhejiang (CN)

(73) Assignees: China Petroleum & Chemical Corporation, Beijing (CN); Zhejieng University, Zhejiang (CN)

( * ) Notice: Subject to any disclaimer, the term of this patent is extended or adjusted under 35 U.S.C. 154(b) by 851 days.

(21) Appl. No.: 13/321,054

(22) PCT Filed: Apr. 15, 2010

(86) PCT No.: PCT/CN2010/000502
§ 371 (c)(1),
(2), (4) Date: Feb. 3, 2012

(87) PCT Pub. No.: WO2010/133081
PCT Pub. Date: Nov. 25, 2010

(65) Prior Publication Data
US 2012/0130034 A1   May 24, 2012

(30) Foreign Application Priority Data

May 18, 2009   (CN) .......................... 2009 1 0098801

(51) Int. Cl.
| | | |
|---|---|---|
| *C08F 2/00* | (2006.01) | |
| *C08F 4/02* | (2006.01) | |
| *B01J 35/06* | (2006.01) | |
| *B01J 31/06* | (2006.01) | |
| *B01J 31/30* | (2006.01) | |
| *B01J 37/02* | (2006.01) | |
| *C08F 10/00* | (2006.01) | |
| *B01J 31/02* | (2006.01) | |
| *B01J 31/26* | (2006.01) | |
| *C08F 110/06* | (2006.01) | |
| *C08F 210/16* | (2006.01) | |

(52) U.S. Cl.
CPC ............... *B01J 35/06* (2013.01); *B01J 31/069* (2013.01); *B01J 31/30* (2013.01); *B01J 37/0244* (2013.01); *C08F 10/00* (2013.01); *B01J 31/0202* (2013.01); *B01J 31/0209* (2013.01); *B01J 31/0247* (2013.01); *B01J 31/26* (2013.01); *C08F 110/06* (2013.01); *C08F 210/16* (2013.01)

(58) Field of Classification Search
CPC .................... C08F 2/00; C08F 4/02

USPC .......................................... 526/203; 502/439
See application file for complete search history.

(56) References Cited

U.S. PATENT DOCUMENTS

| | | | |
|---|---|---|---|
| 4,354,009 A | 10/1982 | Goeke et al. | |
| 4,389,334 A | 6/1983 | Weinert, Jr. et al. | |
| 5,102,964 A | 4/1992 | Kelland | |
| 6,806,221 B2 | 10/2004 | Wagner et al. | |
| 6,982,237 B2 | 1/2006 | Wagner et al. | |
| 7,160,833 B2 | 1/2007 | Wagner et al. | |
| 7,276,566 B2 | 10/2007 | Muruganandam et al. | |
| 7,402,546 B2 | 7/2008 | Klendworth et al. | |
| 2003/0045659 A1 | 3/2003 | Moman et al. | |
| 2004/0229748 A1 * | 11/2004 | Chen et al. | 502/118 |
| 2005/0209097 A1 | 9/2005 | Yang et al. | |
| 2006/0252636 A1 | 11/2006 | Vizzini et al. | |

FOREIGN PATENT DOCUMENTS

| | | |
|---|---|---|
| CN | 1091748 A | 9/1994 |
| CN | 1590415 A | 3/2005 |
| CN | 101027329 A | 8/2007 |
| CN | 101225128 A | 7/2008 |
| WO | WO 00/68277 A1 | 11/2000 |
| WO | WO 02/060962 A1 | 8/2002 |
| WO | WO 2009/029487 A1 | 3/2009 |

OTHER PUBLICATIONS

International Search Report for International Application No. PCT/CN2010/000502, mailed Jul. 22, 2010.
Written Opinion of the International Searching Authority for International Application No. PCT/CN2010/000502, mailed Jul. 22, 2010.
International Preliminary Report on Patentability for International Application No. PCT/CN2010/000502, issued Nov. 22, 2011.

* cited by examiner

*Primary Examiner* — Ling Choi
*Assistant Examiner* — Catherine S Branch
(74) *Attorney, Agent, or Firm* — Finnegan, Henderson, Farabow, Garrett & Dunner, LLP

(57) ABSTRACT

An inorganic/organic composite support includes an inert inorganic material, a complex compound composed of a polylol and a magnesium halide, and an organic polymer containing a polar functional group. Said complex compound loaded with the organic polymer is deposited on the inert inorganic material. When the inorganic/organic composite support used as a polyolefin catalyst carrier is applied to ethene or propylene polymerization, the fusion-flow ratio of the obtained polymerisate is remarkably increased and its processing performance is improved. When the catalyst is applied to ethene polymerization, the fusion-flow ratio of the polymerisate can be adjusted by changing the content of hydrogen. When the catalyst is applied to ethene or propylene polymerization, the catalyst activity is high.

18 Claims, No Drawings

CATALYST SUPPORT USED FOR OLEFIN POLYMERIZATION AND PREPARING METHOD AND APPLICATION THEREOF

CROSS REFERENCE TO RELATED APPLICATIONS

This application is a U.S. national phase application based on PCT/CN2010/000502, filed Apr. 15, 2010, which claimed priority to Chinese Application No. 200910098801.5, filed May 18, 2009.

FIELD OF THE INVENTION

The present invention relates to an olefin polymerization catalyst, specifically relates to a catalyst support for olefin polymerization and preparation methods and applications thereof.

BACKGROUND OF THE INVENTION

Although Ziegler-Natta polyolefin catalyst is originated in the 1950s, but so far it is still the main catalyst used for olefin polymerization. After continuous innovation and development, Ziegler-Natta catalyst which initially mainly consisted of $TiCl_3/AlEt_2Cl$-based now developed to mainly consist of IVB~VB group metal compounds (for example: titanium or vanadium compounds and so on), magnesium halide and at least one electron donor component, such system is effective which play a important role in industrial application and research. Regardless of its application in polymerization in ethylene or propylene, people are constantly improving the productivity and the catalytic performance of the catalyst in order to produce a higher performance polymer resin and reduce energy consumption at the same time.

After numerous studies had been done about the catalyst composition, it is found that the catalytic performance is greatly affected by the catalyst support. The support is not only the dispersant which dispersed the catalyst active site; such dispersant can maximize the catalytic activity, but also the template for polymer growing. The stability and continuity of polymer production is decided by the particle morphology, size, distribution, strength and so on, especially for the gas phase and slurry method, which had been proved by many production practice and research.

Presently, in olefin polymerization catalyst preparation, the method of dispersing catalyst active site is generally as following: (1) support, i.e., catalyst composition is supported on the formed support physically or chemically, such formed support generally is magnesium chloride, silica, alumina, diatomite and other inert inorganic materials, cross-linked polystyrene and other organic substance; (2) the active site is dispersed on magnesium chloride support by co-precipitation of catalyst composition and magnesium chloride, such as the preparation of olefin polymerization catalyst in U.S. Pat. No. 4,354,009; (3)dispersing the active site by spray drying catalyst composition and an inert inorganic material which has very small average size and plays as dispersant together, such as disclosed in U.S. Pat. Nos. 7,276,566, 7,160,833, 6,982,237, 6,806,221, and many other U.S. patents. The above methods used single material as catalyst support or dispersant, and polyethylene with narrow molecular weight distribution and fusion flow ratio generally of 30 or less will be produced when Z-N catalysts according to the above methods are used in ethylene polymerization.

An important way to develop novel support is loading polyolefin catalyst on inorganic/organic composite support.

The activity and selectivity of catalyst, and polymer properties can be adjusted owing to the diversity of the functional group on the organic support. Presently, the main research about inorganic/organic composite support focused on improving the activity of catalyst; properties and morphology of polymer by adjusting the support. As indicated in Sukhdeep Kaur, etc. Mg $(OEt)_2$ and benzyl chloride is reacted together to get $MgCl_2$.xEB solid, said $MgCl_2$.xEB solid is added into homogenous chlorobenzene solution of the copolymer of methacrylic acid and 1-octene to get mixed liquid of $MgCl_2$.xEB/Poly(methyl acrylate-co-1-octene), and catalyst with $TiCl_4$ supported on composite support will be obtained by reacting said mixed liquid with $TiCl_4$ after drying later. Polyethylene with broad molecular weight distribution can be produced by using said catalyst.

SUMMARY OF THE INVENTION

The present invention provides an inorganic/organic composite support, said support can be used in olefin polymerization to produce polymer with high melt flow ratio and broad molecular weight distribution after loading Ziegler-Natta catalyst.

An inorganic/organic composite support comprises an inert inorganic material, a complex compound composed of a polyol and a magnesium halide, and an organic polymer containing a polar functional group, wherein said complex compound composed of a polyol and a magnesium halide is deposited on the inert inorganic material and said organic polymer containing a polar functional group is supported on said complex compound. Said complex has formula as following:

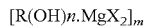

$$[R(OH)n.MgX_2]_m$$

Wherein R is a C1-C20 alkyl, cycloalkyl or aryl; $0 \leq n \leq 4$; X represents halogen; m is a complexing degree, and $0 \leq m \leq 1000$.

Said inert inorganic material preferably is one or more of magnesium chloride, silica gel, alumina, diatomite, most preferably is silica gel.

Silica gel includes porous and non-porous silica gel. Fumed silica is preferred when non-porous silica is used. The average particle size of said fumed silica preferably is not more than 1.0 μm, more preferably not more than 0.5 μm, most preferably 0.2 μm.

When porous silica is used, the pore volume (measured by nitrogen absorption method) of said porous silica is preferably greater than 1.6 cc/g, more preferably greater than 1.8 cc/g, most preferably greater than 2.0 cc/g; BET specific surface area of said porous silica is preferably greater than 100 $m^2/g$, more preferably greater than 200 $m^2/g$, most preferably at least 350 $m^2/g$, and the average particle diameter of said porous silica is preferably less than 20 μm, more preferably less than 10 μm, most preferably less than 5 μm.

The polar functional group of said organic polymer may be one or more of —OH, —COOH, —$NH_2$, —CO—, —CN, —X, —O—, —NH—, —COO—, —CO—NH—, —CO—NH—CO—, —SO—, —$SO_2$—, —O—CO—O—. These polar functional groups can complex with compound of titanium or vanadium so that the active components of catalyst can be better absorbed and dispersed.

Said organic polymer is preferably one or more of regenerated cellulose, cellulose nitrate, cellulose acetate, ethyl cellulose, bisphenol-type polysulfone, aromatic polyether sulfone, phenolphthalein-based polyether sulfone, polyether ketone, aliphatic polyamide, polysulfone amide, aliphatic diacid polyimide, complete aromatic polyimide, polystyrene, styrene copolymers, fluorinated polyimide, polyester, polyethylene copolymers, polypropylene copolymers, poly-4-methyl-1-pentene copolymers, polyacrylonitrile, polyvinyl alcohol, polyvinyl chloride, polyvinylidene chloride, polydimethylsiloxane, poly[1-(trimethylsilyl)-1-propyne], polytetrafuloroethylene, and polyvinylidene fluoride. The above organic polymer contain functional group desired in the present invention, and can be easily dissolved in polar solvent to form homogeneous polymer solution.

Said organic polymer is most preferably styrene copolymer containing —COOH, —COOR, or —CONH$_2$. The viscosity-average molecular weight of said styrene copolymer is under 1,000,000, preferably under 500,000, more preferably under 50,000. The functional group content per gram of the organic polymer containing polar functional group is not less than 1.0 mmol, preferably not less than 2 mmol, more preferably not less than 3 mmol. Said polar functional group has a positive effect on catalytic activity and improves the catalytic activity to a certain extent.

Said polyol is preferably fatty alcohol, more preferably saturated fatty diol, most preferably one or more of ethylene glycol, 1,3-propanediol, 1,4-butanediol, 1,5-pentanediol, and 1,6-hexanediol. Magnesium halide is preferably magnesium chloride.

The present invention also provides a process for preparing the above mentioned inorganic/organic composite support comprising the steps of:

(1) diluting one or more inert organic material in a polar solvent, and adding polyol;

(2) dissolving independently magnesium halide MgX$_2$ in a polar solvent, wherein X represents halogen;

(3) introducing the solution of magnesium halide of step (2) to the solution from step (1) to form a slurry, where the magnesium halide and polyol form a complex;

(4) dissolving organic polymer containing a polar functional group in a polar solvent to form a organic polymer solution;

(5) introducing the organic polymer solution of step (4) to the solution of step (3), stirring the resultant mixture, and slurry is formed; and (6) introducing non-polar solvent to the slurry of step (5), or spray-drying the slurry of step (5) to form the inorganic/organic composite support, washing the composite support with non-polar solvent and drying the composite support.

The mechanism of above reaction is as following: inert inorganic material is reacted with polyol under stirring in the polar solvent, and the polyol can be absorbed to the inert inorganic material in step (1). After adding magnesium halide solution in step (3), the complex will be precipitated quickly and deposited on the inert inorganic material owing to the strong complexing reaction between the polyol and the magnesium halide. By introducing non-polar solvent in step (6), organic polymer will be precipitated from solution and deposited on the surface of complex by phase inversion; or by spray-drying, an inorganic/organic composite support including an inert inorganic material, a complex compound composed of polyol and magnesium halide, and an organic polymer containing a polar functional group will be formed.

In general, the polyol and the inert inorganic material of step (1) is reacted in the polar solvent of about 50° C. for 1 hour under stirring. Reaction will continue at least 30 minutes after adding magnesium halide solution. Then the temperature of the resultant mixture will be reduced to room temperature or lower, such as 0° C. The resultant mixture is mixed with the organic polymer solution and the non-polar solvent is introduced, until desired volume of non-polar solvent is added.

When silica gel is used as inert inorganic material, the purchased silica gel need to be activated. The specific process is as following:

Silica gel is added in to activation furnace and heat treated under nitrogen flow at 200-1000° C., preferably 300-800° C., more preferably 500-700° C., most preferably 600-700° C. for 2-10 hours, preferably for 3-10 hours, more preferably for 3-7 hours so that the hydroxyl content of silica surface will be reduced to 0.5-0.7 mmol/g. Then dehydrated silica gel is formed after cooling to ambient temperature.

In order to improve activity of catalyst, the surface of silica gel need to be modified by using alkyl magnesium to remove residual hydroxyl on the surface of the silica gel. The specific process is as following:

Said dehydrated silica gel and appropriate amount of non-polar solvent is added to a container equipped with a mixer. Said non-polar solvent includes ethane, propane, butane, isobutane, pentane, isopentane, hexane, cyclohexane, heptane, etc., preferably is pentane, isopentane, hexane, cyclohaxane. Then alkyl magnesium is added in a amount of 0.5-0.7 mmol per gram of silica gel. Alkyl magnesium includes diethyl magnesium, dipropyl magnesium, dibutyl magnesium, dihexyl magnesium, dipentyl magnesium, ethylmagnesium chloride, propylmagnesium chloride, butylmagnesium chloride, hexylmagnesium chloride, pentylmagnesium chloride, etc. Reaction is continued under 30-70° C., preferably 35-55° C. for 1-6 hours, preferably for 2-3 hours with stirring. Then the solvent is removed, dried until to be free flowing to form activated silica gel.

The molar ratio of said magnesium halide to the polyol is preferably 0.02-50. The weight ratio of said magnesium halide to the polyol inert inorganic material is preferably 0.01-1. The weight ratio of said organic polymer to the inert inorganic material is preferably 0.01-3.

Said polar solvent is preferably tetrahydrofuran. Said non-polar solvent is a saturated alkane, preferably a saturated alkane having 1-12 carbon atoms, more preferably a saturated alkane having 5-7 carbon atoms.

Stirring speed in said step (4) is preferably under 500 rpm, more preferably 100-300 rpm. Said non-polar solvent is preferably introduced into the slurry in gas phase.

Inorganic/organic composite support can be achieved through phase inversion method by introducing anti-solvent, or by spray-drying.

Said inorganic/organic composite support can be any shape, preferably spherical shape.

When phase inversion method is applied, the volume ratio of said non-polar solvent to the polar solvent is preferably 0.05-20, more preferably 0.1-10, most preferably 0.3-5. Said non-polar solvent is introduced into the slurry from step (5) slowly in vapor, and the introduction time is in the range of 1-20 hours, preferably in the range of 2-5 hours. After the anti-slovent is added, stop stirring the mixture to stand delamination. Filtering or decanting supernatant, and precipitate is obtained after separation. Then washing the precipitate with non-polar solvent repeatedly, the washing is preferably 2-6 times, more preferably 3-4 times, the washing temperature is preferably 50-90° C., more preferably 60-70° C. The process is mainly about to remove excess polar solvent and polyol. After washing, drying with nitrogen purging will be continued until free flowing is achieved.

When spray-drying is applied, the temperature of drying is preferably in the range of 50-90° C. Precipitate obtained by separation is preferably washed by non-polar solvent, such as the alkane. The washing time is preferably 2-6 times, more preferably 3-4 times. The washing temperature is preferably 50-90° C., more preferably 60-70° C. The process is mainly about to remove excess polar solvent and polyol. After washing, drying with nitrogen purged will be continued until free flow is achieved.

The present invention also provides a preparation method for producing a polyolefin catalyst in which the above inorganic/organic composite support is applied. Said method includes following steps:

The catalyst support is dispersed in non-polar solvent, then a compound containing metal of IVB-VB group and an electron donor is added. The precipitate is separated after reaction under stirring, finally the catalyst is obtained after washing and drying.

The hydroxyl of said catalyst support is removed in order to improve catalyst activity. Reagent for removing hydroxyl is alkyl aluminum, titanium tetrachloride, silicon tetrachloride.

Said compound containing metal of IVB-VB group is preferably titanium or vanadium compound, more preferably at least one of titanium tetrachloride, tetrabutoxy titanium, tetramethoxy titanium, tetraethoxy titanium, tetraisopropoxy titanium, diethoxy titanium dichloride, ethoxytitanium trichloride, dibutoxy titanium dichloride, quinolineoxy titanium trichloride and vanadium tetrachloride.

Said electron donor is preferably at least one of ethyl benzoate, dialkyl phthalate ester, phenyl triethoxysilane, diether and succinate.

In order to avoid the violent reaction between compound containing metal of IVB-VB group and organic polymer containing polar functional group, the temperature at the beginning of reaction should be 0-10° C., and the reaction time is over 2 hrs, preferably 2-8 hrs. Then the temperature is raised to 60-80° C. to continue the reaction, and the duration is more than 2 hrs, preferably 2-8 hrs.

The molar ratio of said electron donor to element magnesium in the catalyst support is preferably 0.1-2.0.

Common polymerization conditions in the art can be applied when catalyst of present invention is applied in the polymerization of ethylene or copolymerization of ethylene and α-olefin. In gas phase polymerization, reaction pressure may be in a range of from 0.5 to 5 MPa, and preferably from 1 to 3 MPa; reaction temperature may be in a range of from 30 to 150° C., preferably from 60 to 120° C., and more preferably from 90 to 110° C. Slurry polymerization processes are generally performed under a pressure of from 0.1 to about 5.0 MPa or higher, preferably from about 0.5 MPa to about 2.0 MPa, at a temperature of from 0 to about 120° C., preferably from about 30 to about 110° C., and more preferably from about 60 to about 100° C.

A typical gas phase fluidized bed reaction system consists of a circulating gas compressor, a cooler, and a polymerization reactor where solid particles are fluidized by the circulating gas passing through the reactor. The solid Z-N catalyst of present invention is mixed with mineral oil to form slurry, then the slurry is pumped intermittently or continuously into the reactor, or the resultant solid Z-N catalyst is pumped intermittently or continuously into the reactor by using nitrogen as carrier, and reactants (ethylene and optional α-olefin) as well as a cocatalyst and a molecular weight regulator (preferably hydrogen gas) are continuously added into the circulating gas. Then polymerization reaction occurs in the reactor in the presence of the catalyst, forming a polyethylene. Unreacted gases are withdrawn from the top of the reactor, and are recycled to the reactor after having been compressed and cooled or sent to a torch.

When the solid Z-N catalysts of the invention are used in ethylene polymerization, alkyl metal compounds may be used as cocatalyst and/or scavenger. Examples of the alkyl metal compounds include alkylaluminum compounds, alkyl lithium compounds, alkyl zinc compounds, and alkyl boron compounds, with alkylaluminum compounds being preferred, and with triethyl aluminum, triisobutyl aluminum and tri-n-hexyl aluminum being more preferred. The molar ratio of the alkyl metal compound to the titanium compound may be in a range of from 5:1 to 300:1, preferably from 20:1 to 250:1, and more preferably from 40:1 to 200:1.

The solid Z-N catalysts can be used in homopolymerization of ethylene or copolymerization of ethylene and α-olefin comoners. Examples of suitable α-olefin comonomers include C1-C20 α-olefin, for example, but not limited to, propylene, butene-1, pentene-1, hexene-1, octene-1 or higher α-olefins, with butene-1, hexene-1 and octene-1 being preferred. The molar ratio of the α-olefin (s) to ethylene may be in a range of from 0.01 to 0.5, and preferably from 0.1 to 0.2.

In the ethylene polymerization of the invention, hydrogen gas can be used as a molecular weight regulator. The molar ratio of hydrogen gas to ethylene may be in a range of from 0.01 to 1.0, and preferably from 0.1 to 0.5.

By using the ethylene polymerization process of the invention, it is possible to produce a polymer having a density of from 0.925 to 0.960 g/cm$^3$, and preferably from 0.945 to 0.960 g/cm$^3$, and a high load melt index (FI) of from about 1 to about 200 g/10 min., and preferably from about 2 to about 100 g/10 min. By using the polymerization process of the invention, it is possible to produce a polyethylene with a broad molecular weight distribution, which polyethylene may have a melt flow ratio MFR (MI/FI) of from about 30 to about 200.

Common polymerization conditions in the art can be applied when catalyst of present invention is applied in the copolymerization of propylene or ethylene and α-olefin. A typical loop bulk polymerization process consists of a small tubular loop reactor for catalyst prepolymerization and a large tubular loop polymerization reactor. Propylene, hydrogen, said cocatalyst and electron donor are continuously introduced to the tubular loop reactor. Liquid propylene and polymer are continuously circulated in the reactor. Heat from polymerization reaction is removed by jacket cooling water. Operating pressure in the reactor is 1.0-5.0 MPa, preferably 3.0-4.0 MPa, operating temperature is 50-90° C., preferably 65-75° C., concentration of hydrogen which is for adjusting molecular weight is in a range of 100-8000 ppm, preferably in a range of 500-5000 ppm, ratio of cocatalyst and electron donor is 1-100, preferably 2-40. Electron donor includes ethyl benzoate, dialkyl phthalate, phenyl triethoxysilane, diether, etc.

By performing the propylene polymerization by using the catalyst of the invention, it is possible to produce a polymer having a density of from 0.915 to 0.960 g/cm$^3$, and preferably from 0.915 to 0.930 g/cm$^3$, and a high load melt index (FI) of from about 1 to about 200 g/10 min., and preferably from about 2 to about 100 g/10 min. By using the polymerization process of the invention, it is possible to produce a polypropylene with a broad molecular weight distribution, which polypropylene may have a Mw/Wm molecular weight distribution of about 5-15.

The following methods are used for measuring properties of polymer resin produced in the examples:

ASTM D 1928 for measuring density (DE) of the polymer resins;

ASTM D 1238 for measuring melt index (MI, 2.16 kg load, 190° C.) and flow index (FI, 21.6 kg load, 190° C.) of the polymer resins;

ASTM D638 for measuring tensile strength of the polymer resins; and

Gel permeation chromatography (GPC) for measuring molecular weight distribution.

The present invention provides improvements compared to the prior art in the following aspects:
1) polymer with improved melt flow ratio and processing performance can be obtained when catalysts of present invention are used in ethylene or propylene polymerization;
2) the melt flow ratio (MFR) of polymer can be adjusted by changing hydrogen content when catalysts of present invention are used in ethylene polymerization;
3) catalysts of present invention have high activity when applied in ethylene or propylene polymerization.

EXAMPLES

Example 1

(1) 30 g of styrene-acrylic acid copolymer (produced by Peng Li Co. Jilin, China) is dried by nitrogen at 70-80° C. until the water content of mixture is <0.01 ppm. Then the temperature is dropped to 20° C. 100 mL tetrahydrofuran (THF) is added, styrene-acrylic acid copolymer is completed dissolved under stirring;

(2) 50 g of nonporous fumed silica gel TS-610 (Cabosil™, Cabot, Co.) with average particle size of 0.2 μm is thermal activated under nitrogen purging. The silica is heated at 200° C. for 4 h, then at 600° C. for 4 hrs, and transferred to catalyst preparation bottle then cooled to room temperature. 200 ml of THF and 10 ml of 1,4-butanediol is introduced into the preparation bottle which is placed in a water bath with 50° C., stirring for 1 hr;

(3) 20 g of magnesium chloride and 600 ml of THF is stirred at 55-70° C. under nitrogen protection for 2-4 hrs until magnesium chloride is completely dissolved, so that magnesium chloride solution is formed;

(4) All the magnesium chloride solution of step (3) is slowly introduced to the TS-610/butanediol/THF solution which is under rapid stirring. Keep stirring for 2 hours at 45-50° C. to form slurry support, then the temperature is dropped to 0° C.;

(5) The polymer solution of step (1) is introduced to the slurry of step (4), and the mixture is stirred for 15 min;

(6) 4000 ml of hexane is evaporated at 66° C. and completely in vapor introduced to the slurry support of step (5) which is under high-speed stirring. After the hexane is added, the stirrer is stopped to allow the solids to settle, then the suspension liquid is removed, and the solid precipitate is washed with hexane for three times, thereby obtaining catalyst support;

(7) 8.00 g of above catalyst is introduced to 60 ml of hexane, then the mixture is stirred and the temperature is dropped to 5° C. 1.5 ml of titanium tetrachloride is slowly added, and the reaction is carried out for 2 hrs. Then the temperature is raised to 30° C. and the reaction is carried out for 1 hr, then the temperature is raised to 62° C. and the reaction is carried out for 1 hr. The stirrer is stopped to allow the solids to settle, then the suspension liquid is removed, and the solid precipitate is washed with hexane for three times. 30 ml of hexane, 2 ml of titanium tetrachloride, 1 ml of ethyl benzoate is successively added, and the mixture is stirred for 3 hrs. The stirrer is stopped to allow the solids to settle, then the suspension liquid is removed, and the solid precipitate is washed with hexane for three times. The solids are purged by nitrogen until the solids became free flowing, thereby obtaining supported Z-N catalyst (Ziegler-Natta polyolefin catalyst).

Example 2

A catalyst support and a supported Z-N catalyst is prepared following the procedure described in Example 1, except that the weight ratio of silica gel TS-610, magnesium chloride and styrene-acrylic acid copolymer is 30:20:50, and the total amount of titanium tetrachloride is 5 ml.

Example 3

A catalyst support and a supported Z-N catalyst is prepared following the procedure described in Example 1, except that the organic polymer which is for catalyst support preparation is changed to styrene-acrylamide copolymer, the weight ratio of silica gel TS-610, magnesium chloride and styrene-acrylamide copolymer is 50:30:20, and the total amount of titanium tetrachloride is 8 ml.

Example 4

A catalyst support and a supported Z-N catalyst is prepared following the procedure described in Example 1, except that the organic polymer which is for catalyst support preparation is changed to styrene-acrylamide copolymer, the weight ratio of silica gel TS-610, magnesium chloride and styrene-acrylamide copolymer is 30:20:50, and the total amount of titanium tetrachloride is 10 ml.

Example 5

(1) 350 g of porous silica gel HHV-4 with average particle size of 5 μm (from Tianjin Chemical Research Institute) is charged into an activating furnace having a diameter of 50 mm; with a nitrogen flow passing through the furnace at a rate of 0.10 m/s, the temperature inside the furnace is raised to 120° C. and maintained at that temperature for 2 hours; then the temperature is raised to 600° C. at a rate of 50° C./h and maintained at that temperature for 4 hours; then the temperature is cooled ambient temperature to form activated silica gel. The activated silica gel had a content of surface hydroxyl groups of from 0.5 to 0.7 mmol/g, and is stored under nitrogen until it is used;

(2) Activated silica gel of step (1) and tetrahydrofuran are stirred at ambient temperature, then 70 ml of propylene glycol is added (adding 0.2 ml of propylene glycol per gram of silica gel) at ambient temperature, after stirring 1 hour the temperature is raised to 40° C., then mixture of silica gel HHV-4/ propylene glycol/THF is obtained;

(3) 140 g of magnesium chloride and 3 L of tetrahydrofuran are stirred at 55-60° C. to completely dissolve magnesium chloride, the mixture of step (2) is added to the tetrahydrofuran solution of magnesium chloride, the mixture is stirred for 2 hours and then cooled to ambient temperature;

(4) 210 g of styrene-acrylic acid copolymer and 2.1 L of tetrahydrofuran is placed in another bottle, the mixture is stirred at ambient temperature until the styrene-acrylic acid copolymer is completely dissolved in tetrahydrofuran;

(5) The styrene-acrylic acid copolymer solution of step (4) is introduced to the mixture of step (3), the mixture is stirred at ambient temperature for 15 minutes to form mixture slurry;

(6) 10 L of isopentane is evaporated at 30-35° C. and completely introduced to the slurry support of step (5) in vapor, the stirrer is stopped to allow the solids to settle, then the suspension liquid is removed, and the solid precipitate is washed with isopentane for three times, thereby obtaining catalyst support;

7.00 g of above catalyst support is introduced to suitable amount of isopentane, then the mixture is stirred and the temperature is dropped to 5° C. 0.12 mol of silicon tetrachloride is slowly added, and the reaction is carried out for 2 hrs. The temperature is raised to 30° C. and reaction is carried out for 2 hrs. The stirrer is stopped to allow the solids to settle, then the suspension liquid is removed, and the solid precipitate is washed with isopentane for three times. Suitable amount of hexane, 0.046 mol of titanium tetrachloride, 0.04 mol of phenyl triethoxysilane is successively added, and the mixture is stirred for 3 hrs. The stirrer is stopped to allow the solids to settle, then the suspension liquid is removed, and the solid precipitate is washed with isopentane for three times. The solids are purged by nitrogen until the solids became free flowing, thereby obtaining supported Z-N catalyst.

Example 6

A catalyst support and a supported Z-N catalyst is prepared following the procedure described in Example 5, except that the weight ratio of silica gel HHV-4, magnesium chloride and styrene-acrylic acid copolymer is 30:20:50, the total amount of titanium tetrachloride is 0.08 mol, and the electron donor is changed to 0.06 mol of dialkyl phthalate ester.

Example 7

(1) 200 g porous silica HHV-3 with average particle size of 10 μm (from Tianjin Chemical Research Institute) is charged into an activating furnace having a diameter of 50 mm; with a nitrogen flow passing through the furnace at a rate of 0.10 m/s, the temperature inside the furnace is raised to 120° C. and maintained at that temperature for 2 hours; then the temperature is raised to 600° C. at a rate of 50° C./h and maintained at that temperature for 4 hours; then the temperature is cooled ambient temperature to form activated silica gel. The activated silica gel had a content of surface hydroxyl groups of from 0.5 to 0.7 mmol/g, and is stored under nitrogen until it is used;

(2) Activated silica gel of step (1) and isopentane are stirred at ambient temperature, then 50 ml 1,4-butanediol is added (0.25 ml of 1,4-butanediol per gram of silica gel) at ambient temperature, after stirring 1 hour at 20° C. the temperature is raised to 40° C., then the solution of silica gel HHV-3/butanediol is obtained;

(3) 80 g of magnesium chloride, 120 g of styrene-acrylamide copolymer and 1.8 L of tetrahydrofuran are stirred at 55-60° C. to completely dissolve magnesium chloride, styrene-acrylamide copolymer, thereby obtaining solution of magnesium chloride/styrene-acrylamide copolymer;

(4) The magnesium chloride/styrene-acrylamide copolymer solution of step (3) is introduce to the silica gel HHV-3/butanediol solution of step (2) which is 40° C. and under stirring, the mixture is stirred for 2 hours, then the temperature is cooled to 5° C., thereby obtaining slurry support;

(5) 5 L of isopentane is evaporated at 28-30° C. and completely introduced to the slurry support of step (3) in vapor which is under rapid stirring, the stirrer is stopped to allow the solids to settle, then the suspension liquid is removed, and the solid precipitate is washed with hexane for three times, thereby obtaining catalyst support;

10.00 g of above catalyst is introduced to 60 ml of heptane then the mixture is stirred and the temperature is dropped to 0° C. 0.5 ml of titanium tetrachloride is slowly added, and the reaction is carried out for 2 hrs. Then the temperature is raised to 30° C. and the reaction is carried out for 1 h, then the temperature is raised to 62° C. and the reaction is carried out for 1 hr. The stirrer is stopped to allow the solids to settle, then the suspension liquid is removed, and the solid precipitate is washed with heptane for five times. 50 ml of heptane, 1.5 ml of titanium tetrachloride, 0.8 ml of ethyl benzoate is successively added, and the mixture is stirred for 3 hrs. The stirrer is stopped to allow the solids to settle, then the suspension liquid is removed, and the solid precipitate is washed with heptane for three times. The solids are purged by nitrogen until the solids became free flowing, thereby obtaining supported Z-N catalyst.

Example 8

A catalyst support and a supported Z-N catalyst is prepared following the procedure described in Example 7, except that the weight ratio of silica gel HHV-3, magnesium chloride and styrene-acrylamide copolymer is 30:20:50, and the total amount of titanium tetrachloride is 5 ml.

Comparative Example 1

(1) 150 g of porous silica gel 2485 with average particle size of 40 μm (from Grace Crop.) is charged into an activating furnace having a diameter of 50 mm; with a nitrogen flow passing through the furnace at a rate of 0.10 m/s, the temperature inside the furnace is raised to 120° C. and maintained at that temperature for 2 hours; then the temperature is raised to 600° C. at a rate of 50° C./h and maintained at that temperature for 4 hours; then the temperature is cooled to ambient temperature to form activated silica. The activated silica gel has a content of surface hydroxyl groups of from 0.5 to 0.7 mmol/g, and is stored under nitrogen until it is used;

(2) Activated silica gel of step (1) and isopentane are stirred at ambient temperature, then 80 ml of 1 mol/L TEA is added (0.058 kilogram of TEA per kilogram silica) at ambient temperature, after stirring 1 hour at room temperature the isopentane is removed by nitrogen purging, thereby obtaining chemical activated silica gel;

(3) 10 g of magnesium chloride is dissolved in 300 ml of tetrahydrofuran, then 6.0 ml of titanium tetrachloride is added and the mixture is stirred at 60° C. until transparent yellow solution is formed;

(4) the solution of step (3) is mixed with silica gel of step (2), then the mixture is stirred at 60° C. for 2 h, after removing tetrahydrofuran by nitrogen purging, flowing catalyst is obtained.

Comparative Example 2

(1) 150 g of porous silica gel 955 with average particle size of 40 μm (from Grace Crop.) is charged into an activating furnace having a diameter of 50 mm; with a nitrogen flow passing through the furnace at a rate of 0.10 m/s, the temperature inside the furnace is raised to 120° C. and maintained at that temperature for 2 hours; then the temperature is raised to 600° C. at a rate of 50° C./h and maintained at that temperature for 4 hours; then the temperature is cooled ambient temperature to form activated silica gel. The activated silica gel has a content of surface hydroxyl groups of from 0.5 to 0.7 mmol/g, and is stored under nitrogen until it is used;

(2) Activated silica gel of step (1) and isopentane are stirred at ambient temperature, then 120 ml of TEA of 1 mol/L is added (0.058 kilogram of TEA per kilogram silica) at ambient temperature, after stirring 1 hour at room temperature the isopentane is removed by nitrogen purging, thereby obtaining chemical activated silica gel;

(3) 15 g of magnesium chloride is dissolved in 300 ml of tetrahydrofuran, then 6.0 ml of titanium tetrachloride is added and the mixture is stirred at 60° C. until transparent yellow solution is formed;

(4) the solution of step (3) is mixed with silica gel of step (2), then the mixture is stirred at 60° C. for 2 h, after removing tetrahydrofuran by nitrogen purging, flowing catalyst is obtained.

Z-N catalyst with different composition from examples 1-4 are numbered as A, B, C, D, and compared with traditional catalyst E' from comparative example 1, the results are shown in the Table 1 below.

TABLE 1

| Sample | Composition Ts/Mg/Ps wt/wt | Ti mmol/g | Mg mmol/g | Mg/Ti mol/mol | Ed/Mg mol/mol | $D_{90}$ | $D_{50}$ | $D_{10}$ | Span |
|---|---|---|---|---|---|---|---|---|---|
| A | 50/20/30 | 0.36 | 2.3 | 7:1 | 0.06 | 50.1 | 24.93 | 8.70 | 1.66 |
| B | 30/20/50 | 0.32 | 2.3 | 7:1 | 0.61 | 50.2 | 27.80 | 8.30 | 1.51 |
| C | 50/20/30 | 0.33 | 2.3 | 7:1 | 0.05 | 49.7 | 24.65 | 9.01 | 1.65 |
| D | 30/20/50 | 0.33 | 2.3 | 7:1 | 0.08 | 51.0 | 25.38 | 6.02 | 1.77 |
| E' | — | 0.24 | 0.7 | 3:1 | — | 49.3 | 26.52 | 10.56 | 1.50 |

Remarks: Ps in catalyst A, B represents styrene-acrylic acid copolymer, Ps in catalyst C, D represents styrene-acrylamide copolymer, Ts represents non-porous fumed silica TS-610, Mg represents magnesium chloride, $D_{90}$, $D_{50}$, $D_{10}$ particle size represents the equivalent diameter (average diameter) of the largest particles whose cumulative distribution being 90%, 50%, 10% in the particle size distribution curve respectively, and Span represents dispersion index of the particle size which is the ratio of volume average diameter to number average diameter.

Z-N catalyst with different composition from examples 5-8 are numbered F, G, H, I, and compared with traditional catalyst J' from comparative example 2, the results are shown in the Table 2 below.

TABLE 2

| Sample | Composition Si/Mg/Ps wt/wt | Ti mmol/g | Mg mmol/g | Mg/Ti mol/mol | Ed/Mg mol/mol | $D_{90}$ | $D_{50}$ | $D_{10}$ | Span |
|---|---|---|---|---|---|---|---|---|---|
| E | 50/20/30 | 0.30 | 2.1 | 7:1 | 0.06 | 78.5 | 36.82 | 11.20 | 1.37 |
| F | 30/20/50 | 0.29 | 2.1 | 7:1 | 0.61 | 80.2 | 37.18 | 12.30 | 1.25 |
| G | 50/20/30 | 0.31 | 2.1 | 7:1 | 0.05 | 107.7 | 50.65 | 26.01 | 1.31 |
| H | 30/20/50 | 0.30 | 2.1 | 7:1 | 0.08 | 110.2 | 52.38 | 24.02 | 1.34 |
| J' | — | 0.24 | 0.7 | 3:1 | — | 85.3 | 46.52 | 20.32 | 1.50 |

Remarks: Ps in catalyst F,G represents styrene-acrylic acid copolymer, Ps in catalyst H,I represents styrene-acrylamide copolymer, Si represents silica gel HHV-3/4, Mg represents magnesium chloride, ED represents electron donor; $D_{90}$, $D_{50}$, $D_{10}$ particle size represents the equivalent diameter (average diameter) of the largest particles whose cumulative distribution being 90%, 50%, 10% in the particle size distribution curve respectively, and Span represents dispersion index of the particle size which is the ratio of volume average diameter to number average diameter.

Application Examples 1-4

The atmosphere inside a ϕ80×900 mm small scale fluidized bed polymerization reactor is replaced with nitrogen for 1 hour and then with a circulating gas from a commercial plant (having the following composition by mole: ethylene 37.6%, 1-butene 15.5%, hydrogen 4.7%, nitrogen 35.5% and isopentane 6.7%), concentration of triethylaluminum is 320 ppm, and the replacement is maintained for about 3 hours. The temperature inside the reactor is 81° C. and the reaction pressure is 2.09 MPa. While maintaining the reaction gases to flow, 0.10 g of above-prepared solid Z-N catalyst A, B, C, D is respectively taken into the reactor by high pressure nitrogen (3.0 Mpa). The temperature is controlled ranging 80-82° C., after 2 hours of polymerization, the reaction gas are stopped circulating. Hydrocarbon in the reactor is replaced with nitrogen. The polymer is removed for productivity calculating, characterization and analysis. Properties of polymer using catalyst A, B, C, D of examples 1-4 and E' of comparative example 1 are shown in the table 3 below.

TABLE 3

| Sample | Compositon Ts/Mg/Ps wt/wt | H2/C2 mol/mol | C4/C2 mol/mol | Cat. g | Yield kg/kg | MI dg/min | FI dg/min | MFR | DE g/cc |
|---|---|---|---|---|---|---|---|---|---|
| A | 50/20/30 | 0.125 | 0.412 | 0.100 | 9000 | 0.330 | 12.18 | 36.5 | 0.918 |
| B | 30/20/50 | 0.128 | 0.417 | 0.100 | 12200 | 0.162 | 5.99 | 37.0 | 0.916 |
| C | 50/20/30 | 0.123 | 0.410 | 0.097 | 9100 | 0.356 | 13.17 | 37.3 | 0.918 |
| D | 30/20/50 | 0.124 | 0.416 | 0.101 | 10500 | 0.128 | 4.65 | 36.3 | 0.917 |
| E' | — | 0.126 | 0.416 | 0.100 | 5000 | 0.713 | 20.31 | 28.6 | 0.918 |

Remarks: Ps in catalyst A,B represents styrene-acrylic acid copolymer, Ps in catalyst C,D represents styrene-acrylamide copolymer, Ts represents non-porous fumed silica TS-610, Mg represents magnesium chloride, $H_2/C_2$ represents molar ratio of hydrogen to ethylene; $C_4/C_2$ represents mole ratio of 1-butene to ethylene; Cat. Represents catalyst; MFR represents melt flow ratio i.e. FI/MI.

It can be seen from Table 3 that, compared with the polymer prepared using the traditional catalyst E', the polymer prepared using catalysts of present invention has lower MI, higher MFR, which means the polymer prepared using catalyst of present invention has improved processibility and mechanical property.

Application Examples 5-8

The atmosphere inside a ϕ80×900 mm small scale fluidized bed polymerization reactor is replaced with nitrogen for 1 hour and then with a circulating gas from a commercial plant (having the following composition by mole: ethylene 38.1%, 1-butene 16.5%, hydrogen 7.8%, nitrogen 31.4%, inert alkane isopentane 6.7%), concentration of triethylaluminum is 320 ppm, and the replacement is maintained for about 3 hours. The temperature inside the reactor is 81° C. and the reaction pressure is 2.09 MPa. While maintaining the reaction gases to flow, 0.10 g of above-prepared solid Z-N catalyst A, B, C, D is respectively taken into the reactor by high pressure nitrogen (3.0 Mpa). The temperature is controlled ranging 80-82° C., after 2 hours of polymerization, the reaction gas are stopped circulating. Hydrocarbon in the reactor is replaced with nitrogen. The polymer is removed for productivity calculating, characterization and analysis. Properties of polymer using catalyst A, B, C, D of examples 1-4 and E' of comparative example 1 are shown in the table 4 below.

hydrogen to ethylene id 0.123-0.128. It can be seen from Table 4 that, the MFR of ethylene copolymer is 41.5-44.5 when the weight ratio of fumes silica TS610 to organic polymer Ps is 0.6-1.7, and mole ratio of hydrogen to ethylene id 0.204-0.210. The MFR of comparative example is decreased slightly with the increasing of hydrogen content. The results indicate that when catalyst of present invention is applied in ethylene polymerization, the MFR of the polymerization product may increase with the increasing of hydrogen content. That is, MFR and processibility of polyethylene may be increase with the increasing of hydrogen content when catalyst of present invention is applied in ethylene polymerization.

Application Examples 9-12

The atmosphere inside a ϕ80×900 mm small scale fluidized bed polymerization reactor is replaced with nitrogen for 1 hour and then with a circulating gas from a commercial plant (having the following composition by mole: ethylene 38.0%, 1-butene 16.5%, hydrogen 5.0%, nitrogen 34.5%, isopentane 6.0%), concentration of triethylaluminum is 320 ppm, and the replacement is maintained for about 3 hours. The temperature inside the reactor is 81° C. and the reaction pressure is 2.09 MPa. While maintaining the reaction gases to flow, 0.10 g of above-prepared solid Z-N catalyst F, G, H is respectively taken into the reactor by high pressure nitrogen (3.0 Mpa). The temperature is controlled ranging 80-82° C., after 2 hours of polymerization, the reaction gas are stopped circulating. Hydrocarbon in the reactor is replaced with nitrogen. The polymer is removed for productivity calculating, character-

TABLE 4

| Sample | Compositon | | | | | | | | |
|---|---|---|---|---|---|---|---|---|---|
| | Ts/Mg/Ps wt/wt | $H_2/C_2$ mol/mol | $C_4/C_2$ mol/mol | Cat. g | Yield kg/kg | MI dg/min | FI dg/min | MFR | DE g/cc |
| A | 50/20/30 | 0.205 | 0.433 | 0.107 | 8200 | 0.510 | 22.44 | 44.0 | 0.919 |
| B | 30/20/50 | 0.210 | 0.440 | 0.102 | 9000 | 0.309 | 13.29 | 43.0 | 0.916 |
| C | 50/20/30 | 0.204 | 0.431 | 0.100 | 7800 | 0.611 | 25.36 | 41.5 | 0.918 |
| D | 30/20/50 | 0.207 | 0.436 | 0.103 | 7600 | 0.332 | 14.29 | 43.3 | 0.917 |
| E' | — | 0.200 | 0.440 | 0.101 | 4500 | 1.573 | 45.78 | 27.7 | 0.919 |

Remarks: Ps in catalyst A,B represents styrene-acrylic acid copolymer, Ps in catalyst C,D represents styrene-acrylamide copolymer, Ts represents non-porous fumed silica TS-610, Mg represents magnesium chloride, $H_2/C_2$ represents molar ratio of hydrogen to ethylene; $C_4/C_2$ represents mole ratio of 1-butene to ethylene; Cat. Represents catalyst; MFR represents melt flow ratio i.e. FI/MI.

It can be seen from Table 3 that, the MFR of ethylene copolymer is 36.3-37.3 when the weight ratio of fumes silica TS610 to organic polymer Ps is 0.6-1.7, and mole ratio of ization and analysis. Properties of polymer using catalyst F, G, H, I of examples 1-4 and J' of comparative example 2 are shown in the table 5 below.

Remarks: Ps in catalyst F,G represents styrene-acrylic acid copolymer, Ps in catalyst H,I represents styrene-acrylamide copolymer, Si represents silica HHV3/4, Mg represents magnesium chloride, H2/C2 represents molar ratio of hydrogen to ethylene; C4/C2 represents mole ration of 1-butane to ethylene; Cat. Represents catalyst; MFR represents melt flow ratio, i.e., FI/MI.

TABLE 5

| Sample | Compositon | | | | | | | | |
|---|---|---|---|---|---|---|---|---|---|
| | Si/Mg/Ps wt/wt | $H_2/C_2$ mol/mol | $C_4/C_2$ mol/mol | Cat. g | Yield kg/kg | MI dg/min | FI dg/min | MFR | DE g/cc |
| F | 50/20/30 | 0.132 | 0.434 | 0.120 | 8000 | 1.030 | 41.71 | 40.5 | 0.918 |
| G | 30/20/50 | 0.138 | 0.427 | 0.110 | 10200 | 1.220 | 50.02 | 41.0 | 0.916 |
| H | 50/20/30 | 0.133 | 0.430 | 0.117 | 8300 | 1.135 | 47.78 | 42.1 | 0.918 |

TABLE 5-continued

| | | Compositon | | | | | | | |
|---|---|---|---|---|---|---|---|---|---|
| Sample | Si/Mg/Ps wt/wt | $H_2/C_2$ mol/mol | $C_4/C_2$ mol/mol | Cat. g | Yield kg/kg | MI dg/min | FI dg/min | MFR | DE g/cc |
| I | 30/20/50 | 0.134 | 0.436 | 0.121 | 9500 | 1.026 | 41.66 | 40.6 | 0.917 |
| J' | — | 0.136 | 0.436 | 0.120 | 4800 | 0.683 | 20.49 | 30.07 | 0.918 |

Remarks: Ps in catalyst F,G represents styrene-acrylic acid copolymer, Ps in catalyst H,I represents styrene-acrylamide copolymer, Si represents silica gel HHV-3/4, Mg represents magnesium chloride, $H_2/C_2$ represents molar ratio of hydrogen to ethylene; $C_4/C_2$ represents mole ratio of 1-butene to ethylene; Cat. Represents catalyst; MFR represents melt flow ratio i.e. FI/MI.

It can be seen from Table 5 that, compared with the polymer prepared using the traditional catalyst J', the polymer prepared using catalysts of present invention has lower MI, higher MFR, which means the polymer prepared using catalyst of present invention has improved processibility and mechanical property.

Application Examples 13-16

The atmosphere inside a φ80×900 mm small scale fluidized bed polymerization reactor is replaced with nitrogen for 1 hour and then with a circulating gas from a commercial plant (having the following composition by mole: ethylene 37.5%, 1-butene 16.5%, hydrogen 7.6%, nitrogen 32.4%, isopentane 6.0%), concentration of triethylaluminum is 320 ppm, and the replacement is maintained for about 3 hours. The temperature inside the reactor is 81° C. and the reaction pressure is 2.09 MPa. While maintaining the reaction gases to flow, 0.10 g of above-prepared solid Z-N catalyst F, G, H is respectively taken into the reactor by high pressure nitrogen (3.0 Mpa). The temperature is controlled ranging 80-82° C., after 2 hours of polymerization, the reaction gas are stopped circulating. Hydrocarbon in the reactor is replaced with nitrogen. The polymer is removed for productivity calculating, characterization and analysis. Properties of polymer using catalyst F, G, H, I of examples 1-4 and J' of comparative example 2 are shown in the table 6 below.

TABLE 6

| | | Compositon | | | | | | | |
|---|---|---|---|---|---|---|---|---|---|
| Sample | Si/Mg/Ps wt/wt | $H_2/C_2$ mol/mol | $C_4/C_2$ mol/mol | Cat. g | Yield kg/kg | MI dg/min | FI dg/min | MFR | DE g/cc |
| F | 50/20/30 | 0.203 | 0.440 | 0.107 | 6300 | 2.110 | 97.06 | 46.0 | 0.918 |
| G | 30/20/50 | 0.202 | 0.438 | 0.102 | 6000 | 2.209 | 103.82 | 47.0 | 0.916 |
| H | 50/20/30 | 0.204 | 0.439 | 0.100 | 5800 | 2.311 | 112.08 | 48.5 | 0.917 |
| I | 30/20/50 | 0.205 | 0.436 | 0.103 | 5400 | 2.132 | 102.98 | 48.3 | 0.917 |
| J' | — | 0.200 | 0.440 | 0.101 | 4500 | 1.573 | 45.78 | 29.1 | 0.918 |

Remarks: Ps in catalyst F,G represents styrene-acrylic acid copolymer, Ps in catalyst H,I represents styrene-acrylamide copolymer, Si represents silica HHV3/4, Mg represents magnesium chloride, $H_2/C_2$ represents molar ratio of hydrogen to ethylene; $C_4/C_2$ represents mole ration of 1-butene to ethylene; Cat. Represents catalyst; MFR represents melt flow ratio, i.e., FI/MI.

It can be seen from comparison of Table 5 and 6 that, the MFR of polyethylene produced by using catalyst of present invention increased obviously with the increasing of hydrogen content, while the MFR of polyethylene produced by using catalyst of comparative example is essentially the same. The results indicate that when catalyst of present invention is applied in ethylene polymerization, the MFR of polymer product may be changed with the changing of hydrogen content. It can be noted that the results above is identical with results of application examples 1-8, which means the performance of present catalyst would not change with the change of the inner inorganic materials.

Application Examples 17-20

0.10 g of above-prepared solid Z-N catalyst A, B, C, D and traditional Z-N catalyst E' is taken, and 10 ml of hexane, 7.5 ml of cocatalyst triethylaluminum (with concentration of 10 wt %), 1.0 ml of electron donor isobutyl triethoxy silane (with concentration of 6 wt %) is respectively introduced and mixed. Thereby the supported Z-N catalysts which may be used in propylene polymerization is obtained, respectively a, b, c, d and e', stored until it is used.

The temperature inside a 3 L stainless steel reactor is raised to 70° C. by jacket water, and the water and oxygen in the reactor is replaced with nitrogen. Then the pressure of reactor is raised to 0.4-0.5 Mpa with propylene, and the replacement is conducted twice.

A hydrogen measurement bottle A is filled with hydrogen until the pressure reached 0.2 MPa.

Hydrogen in the above hydrogen measurement bottle A is introduced to the reactor, then 2.3 L liquid propylene and above prepared supported Z-N catalysts are added afterwards, and the temperature inside the reactor is raised to 70° C. When polymerization began, the temperature is controlled ranging 70±0.5° C. by adjusting jacket water, and the reaction pressure is 3.2 Mpa. After 1 hour polymerization, unreacted propylene is sent to a torch after decompression, hydrogencarbon in the reactor is replaced with nitrogen for 2-3 times, thereby obtaining propylene polymer. Properties of propylene polymer using prepared supported Z-N catalyst a, b, c, d and e' of comparative example are shown in the table below.

TABLE 7

| Sample | Composition | | | | | | | | |
| --- | --- | --- | --- | --- | --- | --- | --- | --- | --- |
| | Ts/Mg/Ps wt/wt | TS/PSA wt/wt | $H_2/C_3$ ppm | Al/ED v/v | Cat. g | Yield kg/kg | $MI_{21.6}$ dg/min | Isotacticty % | Mw/Mn |
| a | 50/20/30 | 1.4:1 | 500 | 10:1 | 0.001 | 3800 | 3.3 | 95.2 | 5.3 |
| b | 30/20/50 | 0.6:1 | 560 | 10:1 | 0.001 | 4500 | 3.2 | 95.0 | 6.0 |
| c | 50/20/30 | 1.4:1 | 530 | 10:1 | 0.001 | 4900 | 3.5 | 95.4 | 5.5 |
| d | 30/20/50 | 0.6:1 | 600 | 10:1 | 0.001 | 5200 | 3.6 | 95.7 | 7.0 |
| e' | — | — | 500 | 10:1 | 0.001 | 3100 | 3.3 | 95.8 | 5.0 |

Remarks: PSA in catalyst a, b represents styrene-acrylic acid copolymer; PSA in catalyst c,d represents styrene-acrylamide copolymer; Ts represents non porous fumed silica TS-610; $H_2/C_3$ represents molar ratio of hydrogen to propylene; Al/ED represents mole ratio of triethylaluminium to electron donor; Cat. Represents catalyst; Mw/Mn represents molecular weight distribution.

It can be seen from Table 7 that, the molecular weight distribution Mw/Mn of propylene polymer is in a range of 5.3-7.0 when the Z-N catalyst of present invention is applied in propylene polymerization, which indicates that molecular weight distribution of olefin polymer which is produced in presence of alkyl aluminum and Z-N catalyst which is introduced polystyrene copolymer containing polar functional group and complexed spary-dried with transition metal chloride $TiCl_4$, functional group and magnesium chloride is broader than those of polypropylene produced using traditional catalyst.

While the invention has been described with reference to exemplary embodiments, it will be understood by those skilled in the art that various changes and modifications may be made without departing from the spirit and scope of the invention. Therefore, the invention in not limited to the particular embodiments disclosed as the best mode contemplates for carrying out this invention, but the invention will include all embodiments falling within the scope of the appended claims.

The invention claimed is:

1. An inorganic/organic composite support, comprising at least one inert inorganic material, at least one complex compound comprising a polyol and a magnesium halide, and at least one organic polymer comprising at least one polar functional group, wherein said at least one complex compound comprising a polyol and a magnesium halide is deposited on the at least one inert inorganic material, and wherein said at least one organic polymer comprising at least one polar functional group is supported on said at least one complex compound.

2. The inorganic/organic composite support according to claim 1, wherein said at least one inert inorganic material is chosen from magnesium halide, silica gel, alumina, and diatomite.

3. The inorganic/organic composite support according to claim 1, wherein said at least one organic polymer is a styrene copolymer.

4. The inorganic/organic composite support according to claim 3, wherein said at least one polar functional group of the at least one organic polymer is chosen from —COOH, —COOR, and —CONH$_2$, wherein R is chosen from alkyl groups.

5. The inorganic/organic composite support according to claim 1, wherein said polyol is a fatty alcohol.

6. The inorganic/organic composite support according to claim 1, wherein said at least one complex compound has the following formula:

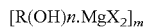

wherein 2≤n≤4, 0<m≤1000, and R is chosen from $C_1$-$C_{20}$ alkyl, cycloalkyl and aryl group.

7. The inorganic/organic composite support according to claim 1, wherein the molar ratio of the magnesium halide to the polyol ranges from 0.02:1 to 50:1, the weight ratio of the magnesium halide to the inert inorganic material ranges from 0.01:1 to 1:1, and the weight ratio of the organic polymer to the inert inorganic material ranges from 0.01:1 to 3:1.

8. The inorganic/organic composite support according to claim 1, which is produced by a method comprising:
  (1) diluting the at least one inert organic material in a polar solvent, and adding the polyol;
  (2) dissolving independently the magnesium halide $MgX_2$ in the polar solvent, wherein X is halogen;
  (3) introducing the solution of magnesium halide of step (2) to the solution from step (1) to form a slurry, wherein the magnesium halide and the polyol form a complex;
  (4) dissolving the organic polymer comprising at least one polar functional group in the polar solvent to form an organic polymer solution;
  (5) introducing the organic polymer solution of step (4) to the slurry of step (3), and stirring the resultant mixture to form a slurry; and
  (6) introducing a non-polar solvent to the slurry of step (5) to form the inorganic/organic composite support, or spray-drying the slurry of step (5) to form the inorganic/organic composite support.

9. A process for preparing an inorganic/organic composite support, comprising:
  (1) diluting at least one inert inorganic material in a polar solvent, and adding a polyol;
  (2) dissolving independently magnesium halide $MgX_2$ in the polar solvent, wherein X is halogen;
  (3) introducing the solution of magnesium halide of step (2) to the solution from step (1) to form a slurry, wherein the magnesium halide and the polyol form a complex;
  (4) dissolving at least one organic polymer comprising at least one polar functional group in the polar solvent to form an organic polymer solution;
  (5) introducing the organic polymer solution of step (4) to the slurry of step (3), and stirring the resultant mixture to form a slurry; and
  (6) introducing a non-polar solvent to the slurry of step (5) to form the inorganic/organic composite support, or spray-drying the slurry of step (5) to form the inorganic/organic composite support.

10. The process according to claim 9, wherein said polar solvent is tetrahydrofuran, and wherein said non-polar solvent is a saturated alkane.

11. A process of olefin polymerization comprising:
introducing at least one olefin;
applying said inorganic/organic composite support according to claim 1 as a support for a supported polyolefin catalyst; and
polymerizing the at least one olefin to form an olefin homopolymer or copolymer.

12. The process according to claim 11, comprising:
dispersing said inorganic/organic composite support in a non-polar solvent;
adding a compound comprising at least one metal of IVB-VB groups and at least one electron donor to form a precipitate;
separating the precipitate after reaction under stirring; and
washing and drying to obtain the supported polyolefin catalyst.

13. The process according to claim 12, wherein said at least one electron donor is chosen from ethyl benzoate, dialkyl phthalate ester, phenyl triethoxysilane, diether and succinate.

14. The process according to claim 11, further comprising adding said supported polyolefin catalyst into a reaction of olefin homopolymerization or copolymerization with at least one α-olefin commoner in a gas phase reactor or a slurry reactor in the presence of at least one alkyl aluminum, and adding hydrogen as a molecular weight regulator.

15. The process according to claim 14, wherein said at least one α-olefin comonomer is C1-C20 α-olefin chosen from propylene, butene-1, pentene-1, hexene-1, octene-1 and decene-1, and wherein said at least one alkyl aluminum is triethylaluminum.

16. The process according to claim 14, wherein an ethylene homopolymer or copolymer is produced having a melt flow ratio MFR ranging from 30 to 200, or wherein a propylene homopolymer or copolymer is produced having a molecular weight distribution above 5.

17. The process according to claim 10, wherein said saturated alkane comprises 5-7 carbon atoms.

18. The process according to claim 12, wherein said at least one metal of IVB-VB groups is titanium or vanadium.

* * * * *

UNITED STATES PATENT AND TRADEMARK OFFICE
CERTIFICATE OF CORRECTION

PATENT NO.       : 9,120,089 B2
APPLICATION NO.  : 13/321054
DATED            : September 1, 2015
INVENTOR(S)      : Yongrong Yang et al.

Page 1 of 1

It is certified that error appears in the above-identified patent and that said Letters Patent is hereby corrected as shown below:

On the Title Page, Item (73) Assignees, lines 2-3, "Zhejieng University" should read --Zhejiang University--.

In the Claims

Claim 6, column 18, line 17, "$[R(OH)n.MgX_2]_m$" should read --$[R(OH)n \cdot MgX_2]_m$--.

Claim 6, column 18, line 20, "cycloalkyl and aryl group." should read --cycloalkyl, and aryl groups.--.

Claim 14, column 20, line 2, "commoner" should read --comonomer--.

Signed and Sealed this
First Day of March, 2016

Michelle K. Lee
*Director of the United States Patent and Trademark Office*